July 31, 1945.  F. W. McINTYRE  2,380,536
FEED FOR PLASTIC MOLDING MACHINES
Original Filed Oct. 14, 1937   2 Sheets-Sheet 1
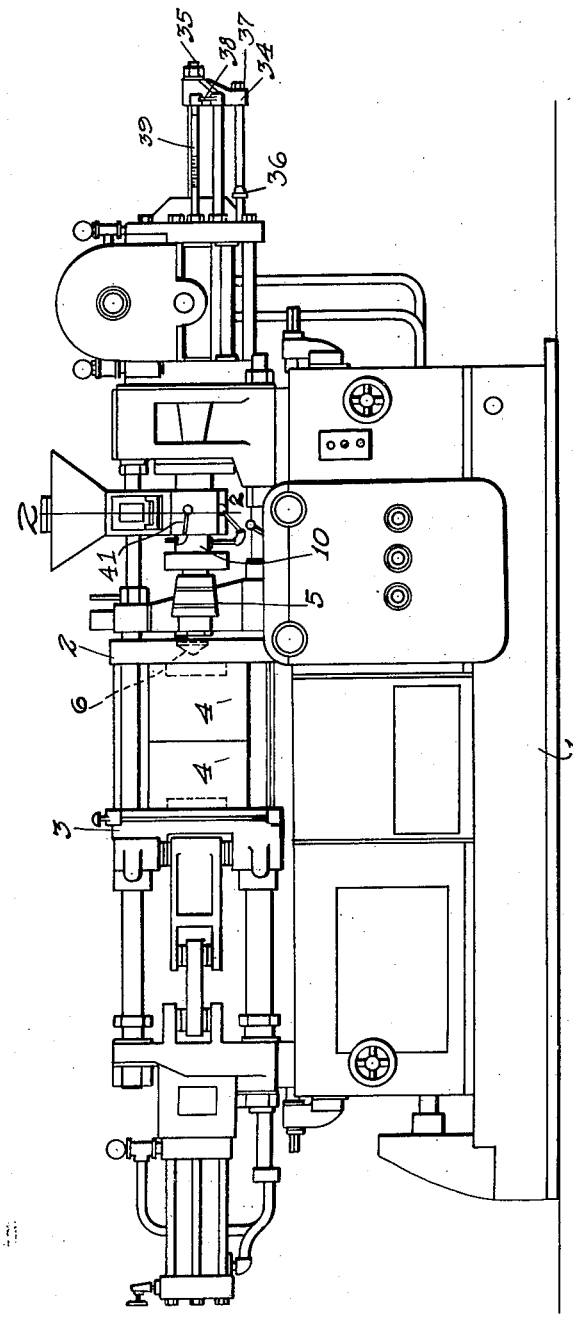
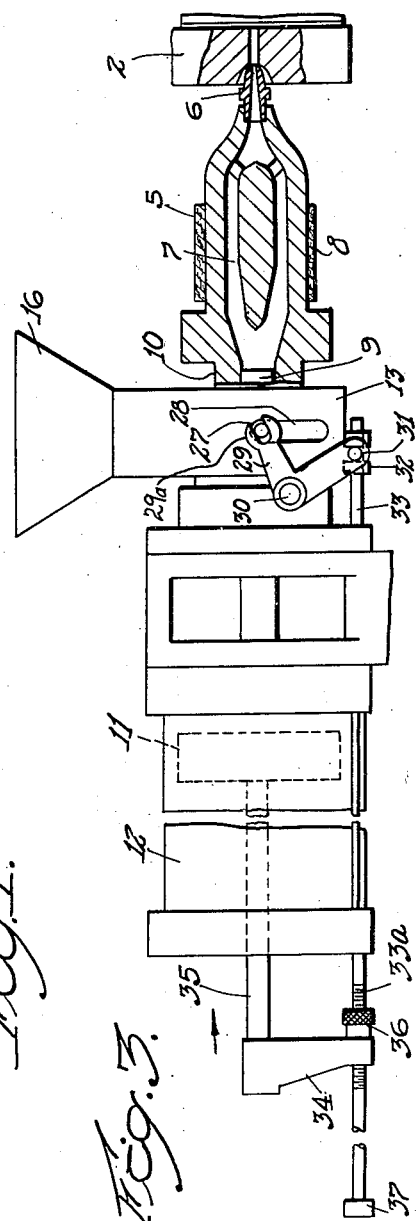
Fig. 1.
Fig. 3.
Inventor:
Frederick W. McIntyre
By Owen N. Kennedy
Attorney

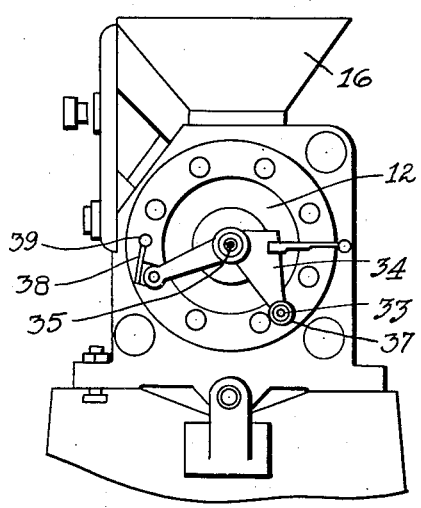
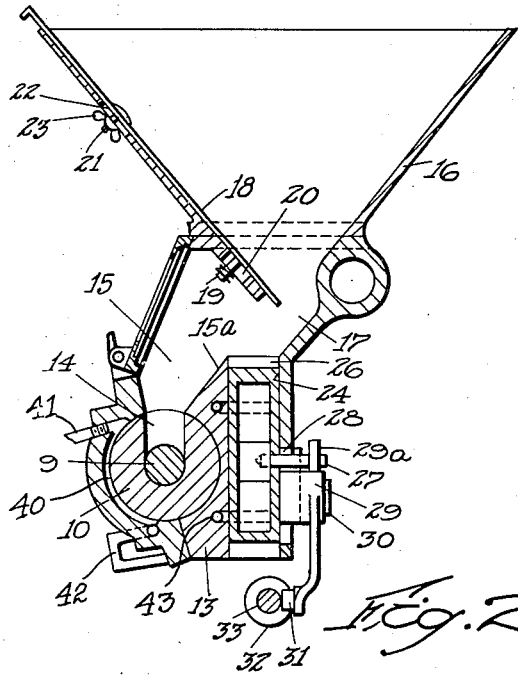
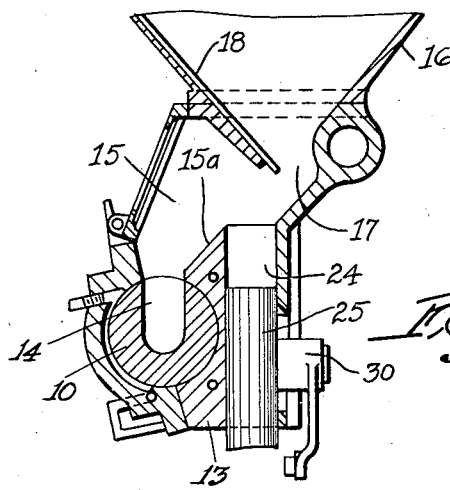

Patented July 31, 1945

2,380,536

UNITED STATES PATENT OFFICE 2,380,536

FEED FOR PLASTIC MOLDING MACHINES

Frederick W. McIntyre, Worcester, Mass., assignor to Reed-Prentice Corporation, Worcester, Mass., a corporation of Massachusetts Original application October 14, 1937, Serial No. 168,987. Divided and this application February 17, 1941, Serial No. 379,157

1 Claim. (Cl. 18—30)

The present invention relates to plastic molding machines, and especially to an improved feed mechanism by which predetermined quantities of plasticizable material are delivered to a heating chamber for each molding operation, this application being a division of my copending application, Serial No. 168,987, filed October 14, 1937, for Plastic molding machine, since issued as Patent No. 2,246,414.

The invention of the present application resides in the provision of means for measuring the quantity of granular or powdered material which is fed into a heating cylinder for injection into molds, while in a plasticized condition. The amount of material delivered for each molding operation is determined by the extent of the movement of the injection plunger by which the plasticized material is forced into the molds, and according to the present invention, the amount of material delivered to the heating chamber is proportional to the amount of plasticized material used.

A further feature of the invention resides in cooling portions of the measuring mechanism so that the granular or powdered material will not be plasticized prematurely, to interfere with its proper functioning. It is essential that the material remain in a granular or powdered form until it is ready to be advanced by the injection plunger, and the cooling means of the present mechanism prevents any premature softening of the material.

Other and further objects and advantages of the invention will more fully appear from the following detailed description taken in connection with the accompanying drawings, in which:

Fig. 1 is a side elevation of a machine embodying the invention.

Fig. 2 is an enlarged sectional view along the line 2—2 of Fig. 1, showing the feed mechanism.

Fig. 3 is a fragmentary view, partially in section, of the feed mechanism of Fig. 1, as viewed from the opposite side.

Fig. 4 is an end view of the machine shown in Fig. 1, as viewed from the right.

Fig. 5 is a fragmentary sectional view, showing the parts of Fig. 2 in different positions.

Referring first to Fig. 1, there is shown an injection molding machine of the type disclosed in my aforesaid original application, and the feed mechanism of the present invention has been shown, for purposes of illustration, as being incorporated therein. The molding machine generally comprises a base 1 providing die plates 2 and 3, on which suitable molds 4 are mounted, the molds 4 being shown in closed position. The plate 3 is movable with respect to the plate 2 for opening and closing the molds 4, and the fixed plate 2 has a heater 5 and nozzle 6 cooperating therewith, by means of which plastic material is adapted to be injected under pressure into the closed molds 4.

As best shown in Fig. 3, the heater 5 provides a chamber 7 surrounded by suitable heating elements 8, and plasticizable material is adapted to be delivered to the chamber 7 by means of a plunger 9 movable in a feed cylinder 10. The plunger 9 is movable back and forth by reason of its connection to a piston 11 operating in a fluid pressure cylinder 12, and each reciprocation of the plunger 9 is adapted to deliver a charge of plasticizable material to the chamber 5. The material is plasticized within the heated chamber 7, and the delivery of fresh material to the chamber by the plunger 9 will cause the plasticized material to be displaced and forced under pressure into the molds 4 through the nozzle 6.

As previously pointed out, the present invention relates to an improved material feeding mechanism for automatically delivering predetermined charges of plasticizable material to the heater in proportion to its rate of use by injection into the molds, and this mechanism is illustrated on an enlarged scale in Fig. 2. As shown, the feed cylinder 10 is carried by a housing 13 forming part of the feed mechanism, and the wall of the cylinder 10 provides a feed opening 14 in communication with a passage 15 providing an inclined face 15a, down which material may pass into the cylinder 10 in front of the plunger 9, when the latter is in its retracted position, as shown in Fig. 5.

The hopper 16 for the powdered or granular plasticizable material is mounted on the housing 13, and provides an opening 17 located in the upper portion of the passage 15 leading to the cylinder 10. A plate 18 is mounted for adjustment on the front wall of the hopper 16, and has its lower end projecting downwardly into the passage 15 to determine the width of the opening 17, and consequently, the freedom with which material may enter the passage 15. The plate 18 is guided by a pin 19 movable in a slot 20 provided by the housing 13, and is also controlled by a stud 21 carried by the plate and movable in a slot 22 in the wall of the hopper 16. A wing nut 23 on the stud 21 provides means for locking the plate 18 in adjusted position to obtain a predetermined width of the opening 17, depending on the degree of freedom with which material will flow from the hopper by gravity.

Beneath the lower end of the hopper opening 17, the housing 13 provides a vertical bore 24, in which is received a measuring plunger 25. This plunger is movable between the extreme positions shown in Figs. 2 and 5, and when its upper end is below the open end 26 of the bore, material from the hopper 16 is adapted to flow into the bore 24 through the opening 17. Upward movement of the plunger 25 is adapted to discharge a predetermined quantity of plasticizable material from within the bore 24 into the passage 15, wherein it slides down the inclined face 16a into the opening 14 in the top of the feed cylinder 10. It is to be noted that the lower edge of the plate 18 restricts the opening 17 at the bottom of the hopper 16 to such an extent that the material will flow freely only into the bore 24 when the plunger 25 is retracted.

The measuring plunger 25 is adapted to move in response to back and forth movement of the injection plunger 9, to which end the plunger 25 provides a stud 27 projecting through a slot 28 provided in the wall of the housing 13 adjacent the bore 24. The end of the stud 27 is engaged by a fork 29a provided at the end of one arm of a bell crank lever 29 pivotally mounted on a pin 30. The free end of the other arm of the lever 29, extends downwardly and carries a pin 31 positioned between spaced collars 32 mounted on a rod 33, see Fig. 2.

As best shown in Fig. 3, the rod 33 is slidably mounted for horizontal movement, and extends rearwardly beyond the cylinder 12, where it passes freely through an opening in an arm 34 mounted on the end of a rod 35 movable with the piston 11, which operates the injection plunger 9. The feed control rod 33 carries a collar 36 adjustable on a threaded portion 33a of the rod, and this collar 36 is adapted to be engaged by the arm 34 as the piston 11 moves the plunger 9 to the forward end of its injection stroke, as indicated in Fig. 3. The rod 33 also carries a fixed collar 37 at its left-hand end, which is engaged by the arm 34 as the piston 11 moves the plunger 9 to the end of its return stroke, as indicated by the position of parts in Fig. 1.

It is to be noted from Figs. 2 and 3, that the injection plunger 9 has moved the measuring plunger 25 to the upper end of its bore 24 only after the feed opening 14 has been occupied by the plunger 9. Consequently, the entire charge of fresh material, as fed by the plunger 25, remains on top of the plunger while the plasticized material in front of the plunger is injected into the molds 4. Obviously, the measuring plunger 25 will remain in its raised position of Fig. 2 until the plunger 9 nears the end of its retracting movement, so that the plunger 25 is activated only at the completion of the movements of the plunger 9 in opposite directions.

The measuring plunger 25 is thus moved up and down within the bore 24 in proportion to movement of the injection plunger 9, and the arrangement is such that the amount of material delivered to the passage 15 when the plunger 25 moves upwardly, is substantially equal to the amount of material injected into the molds 4 by movement of the plunger 9 to the position of Fig. 3. When the plunger 9 is retracted at the end of the molding cycle, the material which has previously entered the feed opening 14 in the cylinder 10, and has rested on top of the plunger 9 in the meanwhile, falls in front of the retracted plunger 9, in readiness for entry into the heating chamber 7 on the next injection stroke of the plunger 9.

If for any reason the plunger 9 does not inject a normal charge of plasticized material into the molds 4, and so does not complete its full injection stroke, upward movement of the measuring plunger 25 will be automatically decreased, owing to the fact that the arm 34 will not carry the collar 36 on the rod 33 to the extreme position of Fig. 3. The resulting reduced upward movement of the plunger 25 causes less material to be displaced from the bore 24 for delivery into the feed cylinder 10 when the plunger 9 is again retracted. Consequently, it is impossible for the feed cylinder 10 to become jammed with unplasticized material, as might otherwise occur should an unvarying predetermined amount of material be fed for each injection stroke of the plunger, independently of the length of this stroke.

Obviously, the fact that the collar 36 is adjustable on the rod 33, permits the charges of material that are to be fed for each reciprocation of the measuring plunger 25, to be accurately determined in advance of operation of the machine with a predetermined normal stroke of the injection plunger 9. In this way, variations in the physical characteristics of different thermoplastic materials as regards expansion and contraction, can be compensated for in advance, independently of the automatic control of the material fed, in proportion to the actual stroke of the injection plunger for each molding operation. In order to aid in setting the collar 36, the rod 35 provides a pointer 38 cooperating with a scale 39 extending horizontally from the cylinder 12, as shown in Figs. 1 and 4. The pointer 38 indicates the position of the injection plunger 9, so that by reference to the scale 39, it is possible to adjust the position of the collar 36, to insure completion of the upward movement of the measuring plunger 25 before the plunger 9 reaches the extreme end of its normal injection stroke.

As previously pointed out, the invention also contemplates means for cooling the material feeding mechanism to such an extent that premature plasticization cannot occur prior to delivery of the material to the heating chamber 7. To this end, the housing 13 provides a curved recess 40, partially surrounding the cylinder 10, as shown in Fig. 2, to provide for the circulation of a cooling medium entering through a pipe 41. An outlet 42 from the lower end of recess 40 leads to channels 43 extending through the wall of the housing 13 adjacent the bore 24 for the measuring plunger 25. The material surrounding the cylinder 10 and the bore 24 is thus maintained at a sufficiently low temperature to prevent premature plasticization of the material being fed, due to transmission of heat from the chamber 7.

From the foregoing, it is apparent that by the present invention there is provided an improved mechanism for feeding raw material to the heating chamber of an injection molding machine in successive charges, each automatically proportioned to the rate of use of the plasticized material by its injection into the molds.

I claim:

In a plastic molding machine, a casing having a substantially horizontal bore therein, a horizontally movable plunger in said bore for directing plastic material into a die cavity, at the end of movement of said plunger in one direction, a passage in said casing and communicating with said bore, a vertical plunger positioned adjacent to said first plunger and movable in a bore communicating at its upper end with the passage at a point above the horizontal bore, where, upon vertical movement of the second plunger, a predetermined amount of material is discharged from on top of the vertical plunger into the passage, and means for moving said vertical plunger in proportion to the movement of the horizontal plunger to cause said vertical plunger to deliver said material on top of the horizontal plunger, while the latter is in position to close the bottom of said passage.

FREDERICK W. McINTYRE.